US009906825B2

(12) United States Patent
Black

(10) Patent No.: US 9,906,825 B2
(45) Date of Patent: *Feb. 27, 2018

(54) METHOD AND SYSTEM FOR PLANNING AND RUNNING VIDEO-ON-DEMAND ADVERTISING

(71) Applicant: Comcast Cable Communications, LLC, Philadelphia, PA (US)

(72) Inventor: Neville A. Black, Collegeville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,718

(22) Filed: Aug. 6, 2015

(65) Prior Publication Data

US 2016/0073147 A1 Mar. 10, 2016

Related U.S. Application Data

(63) Continuation of application No. 10/701,895, filed on Nov. 5, 2003, now Pat. No. 9,136,956.

(51) Int. Cl.
*H04N 21/2668* (2011.01)
*G06Q 30/02* (2012.01)
(Continued)

(52) U.S. Cl.
CPC ......... *H04N 21/2668* (2013.01); *G06Q 30/02* (2013.01); *G06Q 30/0257* (2013.01);
(Continued)

(58) Field of Classification Search
CPC ........... H04N 21/25883; H04N 21/812; H04N 21/2668; H04N 21/25; H04N 21/251;
(Continued)

(56) References Cited

U.S. PATENT DOCUMENTS 5,155,591 A 10/1992 Wachob
5,424,770 A 6/1995 Schmelzer et al.
(Continued)

FOREIGN PATENT DOCUMENTS

CA 2544941 10/2004
EP 04795735.2 10/2004
(Continued)

OTHER PUBLICATIONS

European Office Action—EP Appl. 04795735.2—dated Sep. 24, 2015.
(Continued)

*Primary Examiner* — Olugbenga Idowu
(74) *Attorney, Agent, or Firm* — Banner & Witcoff, Ltd.

(57) ABSTRACT

A method and system for planning and running video-on-demand (VOD) advertising includes a planner for planning advertising campaigns and an ad selector for running selected advertisements from selected ones of the campaigns.
The campaigns are associated with household demographic classifications, video content category categories, household geographic locations, and/or video viewing times. In response to a viewer requesting a video, the selector selects the campaigns corresponding to the demographic classification associated with the viewer, the content category of the requested video, the geographic location associated with the viewer, and/or the viewing time at which the requested video is viewed. The demographic classification is determined by using an identifier of the viewer's set-top-box. The selector may select the campaigns corresponding to the content categories of the requested video. The content categories are determined by using an identifier associated with the requested video.

20 Claims, 2 Drawing Sheets

(51) Int. Cl.

| | | |
|---|---|---|
| *H04H 20/10* | (2008.01) | |
| *H04H 20/38* | (2008.01) | |
| *H04H 60/06* | (2008.01) | |
| *H04H 60/40* | (2008.01) | |
| *H04H 60/45* | (2008.01) | |
| *H04H 60/52* | (2008.01) | |
| *H04H 60/63* | (2008.01) | |
| *H04N 7/173* | (2011.01) | |
| *H04N 21/258* | (2011.01) | |
| *H04N 21/426* | (2011.01) | |
| *H04N 21/472* | (2011.01) | |
| *H04N 21/81* | (2011.01) | |
| *H04N 21/2225* | (2011.01) | |
| *H04N 21/239* | (2011.01) | |
| *H04N 21/2547* | (2011.01) | |
| *H04N 21/262* | (2011.01) | |
| *H04N 21/2665* | (2011.01) | |

(52) U.S. Cl.
CPC .......... *H04H 20/103* (2013.01); *H04H 20/38* (2013.01); *H04H 60/06* (2013.01); *H04H 60/40* (2013.01); *H04H 60/45* (2013.01); *H04H 60/52* (2013.01); *H04H 60/63* (2013.01); *H04N 7/17318* (2013.01); *H04N 21/2225* (2013.01); *H04N 21/2393* (2013.01); *H04N 21/2547* (2013.01); *H04N 21/25841* (2013.01); *H04N 21/25883* (2013.01); *H04N 21/2665* (2013.01); *H04N 21/26241* (2013.01); *H04N 21/42684* (2013.01); *H04N 21/47202* (2013.01); *H04N 21/812* (2013.01)

(58) Field of Classification Search
CPC ........... H04N 21/252; H04N 21/25435; H04N 21/2547; H04N 21/26241; H04N 21/4532; H04N 21/454; H04N 21/458; H04N 21/472; H04N 21/47202; H04N 21/47208; H04N 21/47211; H04N 21/47217; H04N 21/4825; H04N 21/4826; G05Q 30/0241; G06Q 30/02
USPC ................................ 725/46, 42, 43
See application file for complete search history.

(56) References Cited

U.S. PATENT DOCUMENTS

| | | |
|---|---|---|
| 5,432,542 A | 7/1995 | Thibadeau et al. |
| 5,515,098 A | 5/1996 | Carles |
| 5,600,366 A | 2/1997 | Schulman |
| 5,652,615 A | 7/1997 | Bryant et al. |
| 5,661,516 A | 8/1997 | Carles |
| 5,694,162 A | 12/1997 | Freeny, Jr. |
| 5,774,170 A | 6/1998 | Hite et al. |
| 6,002,393 A | 12/1999 | Hite et al. |
| 6,070,186 A | 5/2000 | Nishio |
| 6,160,989 A | 12/2000 | Hendricks et al. |
| 6,285,987 B1 | 9/2001 | Roth et al. |
| 6,388,712 B1 | 5/2002 | Shinohara et al. |
| 7,039,938 B2 | 5/2006 | Candelore |
| 9,136,956 B2* | 9/2015 | Black .................... G06Q 30/02 |
| 2002/0083444 A1 | 6/2002 | Blasko et al. |
| 2002/0124249 A1 | 9/2002 | Shintani et al. |
| 2002/0124254 A1 | 9/2002 | Kikinis |
| 2002/0188545 A1 | 12/2002 | Wiesehuegel et al. |
| 2003/0149975 A1 | 8/2003 | Eldering et al. |
| 2003/0191816 A1 | 10/2003 | Landress et al. |
| 2003/0220866 A1 | 11/2003 | Pisaris-Henderson et al. |
| 2003/0226142 A1 | 12/2003 | Rand |
| 2004/0003413 A1 | 1/2004 | Boston et al. |
| 2004/0260608 A1* | 12/2004 | Lewis .................... G06Q 20/20 |
| | | 705/14.35 |
| 2005/0021395 A1 | 1/2005 | Luu |
| 2005/0021444 A1 | 1/2005 | Bauer et al. |
| 2005/0182647 A1* | 8/2005 | Saenz ................. G06Q 30/016 |
| | | 705/345 |
| 2006/0015449 A1 | 1/2006 | Underwood et al. |
| 2006/0161947 A1 | 7/2006 | Laksono et al. |
| 2006/0190964 A1 | 8/2006 | Eldering |
| 2007/0168557 A1 | 7/2007 | Henry |
| 2007/0220596 A1 | 9/2007 | Keeler et al. |
| 2009/0210901 A1* | 8/2009 | Hawkins ............. H04H 20/106 |
| | | 725/34 |
| 2012/0323705 A1 | 12/2012 | Calder et al. |
| 2014/0013354 A1 | 1/2014 | Johnson et al. |
| 2016/0073147 A1* | 3/2016 | Black .................... G06Q 30/02 |
| | | 725/35 |

FOREIGN PATENT DOCUMENTS

| | | |
|---|---|---|
| WO | 03053056 A1 | 6/2003 |
| WO | 03/058531 A1 | 7/2003 |
| WO | PCT/US04/34614 | 10/2004 |

OTHER PUBLICATIONS

Jan. 11, 2017—(CA) Office Action—App 2,544,941.
European Office Action—EP Appl. 04795735.2—dated Jul. 15, 2016.
Supplementary European Search Report in related European patent application No. EP 04795735, dated Oct. 21, 2009.
Office action EP 04795735.2, dated Apr. 10, 2012.

* cited by examiner

METHOD AND SYSTEM FOR PLANNING AND RUNNING VIDEO-ON-DEMAND ADVERTISING

CROSS-REFERENCE TO RELATED APPLICATION(S)

The present application is a continuation application of U.S. patent application Ser. No. 10/701,865 filed Nov. 5, 2003. The content of the foregoing application is hereby incorporated by reference in its entirety.

BACKGROUND OF THE INVENTION

1. Field of the Invention

The present invention relates to a method and system for planning and running video-on-demand (VOD) advertising 2. Background Art Video distribution systems may be configured to enable a service provider to distribute videos for viewing by viewers in response to requests for the videos by the viewers. Such a video distribution service is known as video-on-demand (VOD). In VOD, video distribution systems include a communications network which enables communications between a service provider and viewers. The provider is typically a cable service provider and the network is typically a cable communications network. A viewer communicates a request for a video over the network to the provider. In response to the request, the provider communicates the requested video over the network to the viewer.

Viewers view requested videos on display devices such as televisions. Each television has a communications network transceiver device such as a set-top-box (STB). The STBs connect the respective televisions to the network on the viewer side of the network.

The provider has video servers which connect to the network on the provider side of the network. The video servers have access to stored videos which the provider may offer to the viewers for viewing. In response to a request from a viewer to view a video, a video server provides the requested video to the network for distribution to the STB of the television of the viewer requesting the video. The viewer then views the requested video on the viewer's television.

SUMMARY OF THE INVENTION

An object of the present invention is to provide a method and system for planning and running video-on-demand (VOD) advertising.

Another object of the present invention is to provide a method and system for running VOD advertising in which selected advertisements accompany the requested video. The advertisements are selected as a function of at least one of the content category of the requested video, a demographic classification corresponding to the neighborhood of the residence from which the viewer requested the video, the geographic location of the residence from which the viewer requested the video, and the time at which the viewer requested the video.

A further object of the present invention is to provide a method and system for planning VOD advertising in which an advertiser's campaign of advertisements is selectively associated with at least one of the content categories of videos available for viewer request, demographic classifications corresponding to the neighborhoods of the residences from which viewers request videos, the geographic locations of the residences from which viewers request videos, and the times at which viewers request videos.

In carrying out the above objects and other objects, the present invention provides a method for planning VOD advertising to accompany videos when the videos are delivered by a service provider to viewers in response to requests for the videos by the viewers. Each video has at least one content category. Each viewer is located at a respective residence. Each respective residence is in a neighborhood and has a geographic location. Each neighborhood has a corresponding demographic classification.

The method includes defining advertising campaigns each having at least one advertisement. The method further includes associating each advertising campaign with at least one content category, at least one geographic location served by the service provider, at least one demographic classification, and at least one interval of time The method may include identifying the advertising campaigns which are associated with at least one content category matching the content categories of a video, a demographic classification matching the demographic classification corresponding to the neighborhood of the residence at which a viewer is located, a geographic location matching the geographic location of the residence at which a viewer is located, and an interval of time matching the time at which a viewer requests the video. At least one advertisement of at least one of the identified advertising campaigns may then be identified as being eligible for accompanying the video. The matching may be done using rule based associations which are either determinative or predictive.

Further, in carrying out the above objects and other objects, the present invention provides a VOD system and an associated method. The VOD system includes a display device having a set-top-box (STB). The STB has an identifier and is located at a residence in a neighborhood. A server is connected to the STB. The server transmits a video to the STB upon receiving a request for the video from a viewer of the display device.

A selector is operable for using an identifier indicative of the video to determine content categories of the video. The selector is operable for using the STB identifier to determine both a demographic classification corresponding to the neighborhood of the residence and a geographic location of the residence. The selector selects advertisements from a group of advertisements as a function of at least one of the content categories of the requested video, the demographic classification of the residence, the geographic location of the residence, and the time at which the request for the video is made. The server transmits the selected advertisements with the video to the STB for the viewer to view on the display device.

The advantages accruing to the present invention are numerous. For instance, the present invention matches content and target audience. The present invention solves the problem of advertising effort being wasted on uninterested viewers in a general VOD viewer audience by providing selected advertisements to VOD viewers.

Advertisers will benefit from the present invention as small advertisers that do not have the budget to advertise to a general audience are now able to literally buy a part of the audience for a popular show, and to be the sponsor for the show for that part of the audience, so that all the advertisements shown to that part of the audience are from the one advertiser.

DETAILED DESCRIPTION OF THE PREFERRED EMBODIMENT(S)

Figure 1:
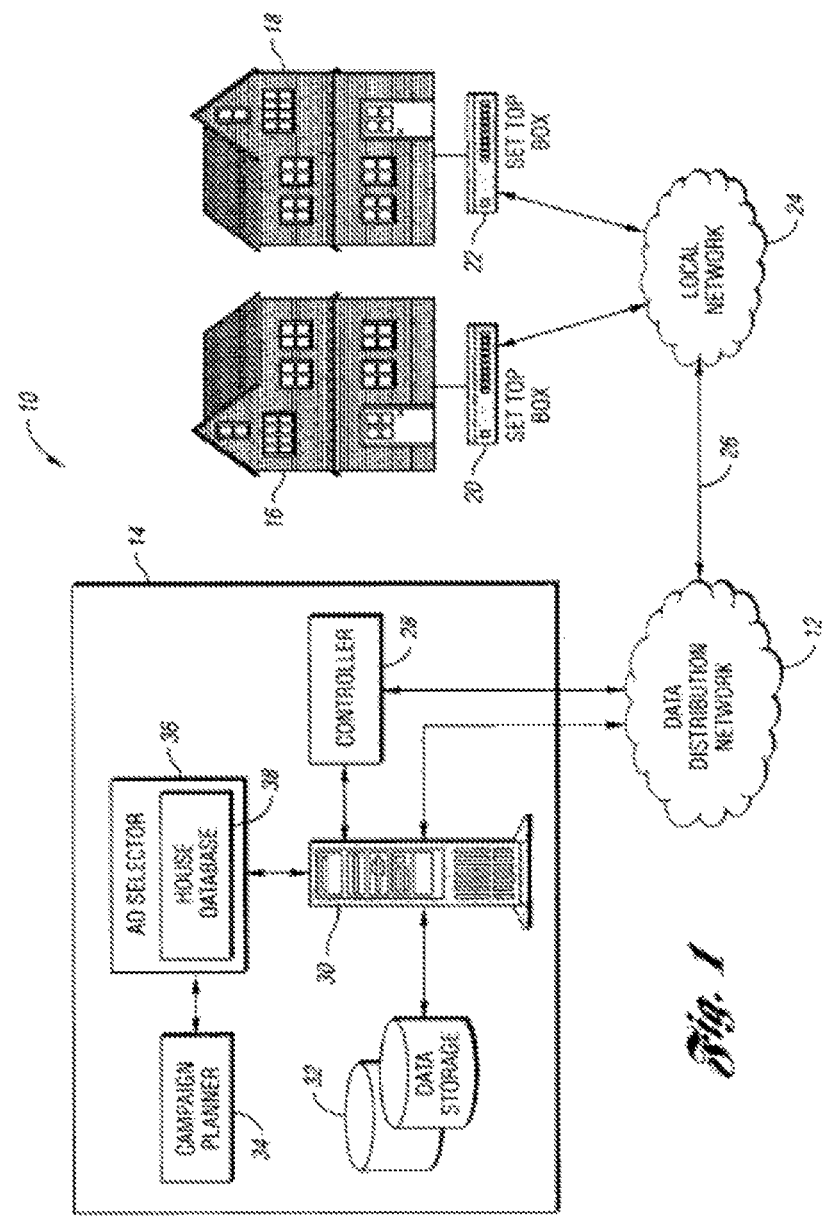
FIG. 1 illustrates a block diagram of a video-on-demand (VOD) system in accordance with the present invention.

Referring now to FIG. 1, a block diagram of a video-on-demand (VOD) system 10 in accordance with the present invention is shown. VOD system 10 includes a data communications network 12. Network 12 connects a cable service provider 14 to viewers such as viewers 16 and 18. Network 12 enables two-way communication between provider 14 and viewers 16 and 18 in households to enable the provider to provide videos for viewing by the viewers in response to viewer requests. For instance, viewer 16 communicates a request for a video over network 12 to provider instance 14. In response to this request, provider 14 communicates the requested video via network 12 to viewer 16. Network 12 also distributes television signals in an analog radio-frequency format to viewers 16.

Viewers 16 and 18 have their own display devices such as televisions for receiving and viewing requested videos provided by provider 14. As such, viewers 16 and 18 view requested videos distributed by provider 14 on the display devices, i.e., televisions. Each television has a respective communications network transceiver device such as a set-top-box (STB) 20 and 22. STBs 20 and 22 connect the televisions of viewers 16 and 18 to network 12.

Viewers 16 and 18 may be located in a local geographic area such as a neighborhood. In this event, a local data communications network 24 connects network 12 and viewers 16 and 18. Networks 12 and 24 may have a hybrid fiber coax (HFC) architecture. As such, network 12 includes optical fiber for internal communications and an optical fiber 26 connects networks 12 and 24. Cable connections 28 connect local network 24 to STBs 20 and 22 of viewers 16 and 18.

Provider 14 has a controller 28 and a video server 30. Controller 28 connects to network 2 to enable provider 14 to communicate with viewers 16 and 18 and to control the video programming provided by the provider. Video server 30 has access to data storage 32 for storing videos and advertisements. Provider 14 communicates with viewers 16 and 18 to offer the videos for viewing by the viewers. Video server 30 connects to network 12 to transmit a video requested by a viewer such as viewer 16 to STB 20 of the viewer's television. Viewer 16 then views the requested video on the viewer's television. As a result, VOD system 10 is configured to enable viewer 16 to view "videos-on-demand" ("VOD") from provider 14.

In accordance with the present invention, provider 14 includes a campaign planner subsystem 34 and an advertisement (ad) selector subsystem 36 which together form a system for planning and running VOD advertising. Campaign planner 34 enables provider 14 to set-up advertising campaigns for different advertisers. Each advertising campaign has one or more advertisements (i.e., ads). The ads in the advertising campaigns are available for distribution to viewers 16 and 18 in accordance with defined rules. Video server 30 is operable to distribute the ads of the advertising campaigns which satisfy the rules to viewers 16 and 18 along with requested videos.

Campaign planner 34 enables the rules for the advertising campaigns and the ads to be defined. The rules restrict which advertising campaigns and which ads in those advertising campaigns are to be presented to viewers 16 and 18 during the viewing of requested videos. The rules identify the ads which are eligible for distribution to a VOD viewer audience and, accordingly, enable targeted ads to be presented to the VOD viewer audience. To this end, the rules restrict the availability of the ads of advertising campaigns to a viewer's television as a function of at least one of the content category that a requested video satisfies, a demographic classification corresponding to the neighborhood of the residence in which the STB of the viewer's television is located, the geographic location of the residence in which the STB is located, and the time at which the requested video runs on the viewer's television.

Ad selector 36 applies the rules to identify the advertising campaigns and which ads in those advertising campaigns are to be presented to viewer 16 during the viewing of a requested video by the viewer. In order to apply the rules for the particular viewing of the requested video by viewer 16, ad selector 36 determines the identity and content of the requested video, the geographic location of the residence in which STB 20 of the television of viewer 16 is located, the demographic classification corresponding to the neighborhood of the residence in which the STB is located, and the time at which the requested video is to run on the television for the viewer.

In order to determine the identity and the content of the requested video, ad selector 36 obtains the asset identifier of the requested video when viewer 16 requests the video. Using the asset identifier, ad selector 36 identifies the requested video and the content category or categories that the requested video satisfies. Each eligible video has content which falls into at least one content category. Content categories may include, for example, audience categories such as kids, teens, general-male, general-female; genre categories such as sports, news, soaps, cartoons, drama, biography; and particular content providers such as HBO™, ESPN™, Discovery™. As an example, a requested video of a football game would fall into the sports category and perhaps the general-male category as well.

Ad selector 36 uses an identifier of STB 20 of the television of viewer 16 to determine the geographic location of the residence in which the STB is located. STB 20 identifier, such as a "unit address" associated with the STB or a serial number of the STB, enables ad selector 36 to determine geographic location information such as the street address, the ZIP area code, and the ZIP+4 area code of the residence (i.e., household, business site, public/private facility, etc.) in which STB 20 and, consequently, viewer 16 are located. To this end, ad selector 36 has a house database 38 which stores a list of the identifiers of the STBs serviced by provider 14 and stores a corresponding list of ZIP and ZIP+4 area codes associated with the residences in which the STBs are located.

Based on the geographic location of the residence (i.e., household) in which STB 20 is located, such as the ZIP+4 area code of the household in which the STB is located, a demographic classification corresponding to the household in which the STB is located may be determined. The demographic classifications are provided by a marketing provider and may be stored in a list in house database 38. The demographic classification corresponding to the household in which STB 20 is located is indicative of demographic characteristics of the neighborhood in which the household is located. As viewer 16 is likely to belong to the household in which STB 20 is located, the determined demographic classification of the household in which STB 20 is located is likely to be indicative of demographic characteristics of the viewer. It is noted that, instead of ZIP+4 area codes being used to obtain the demographic classification, similar types of information such as "census block" data may be used to obtain the corresponding demographic classification.

Using the demographic classification corresponding to the household in which STB 20 is located, the geographic location of the household in which the STB is located, the content category or categories of the video requested by viewer 16, and the time that the requested video is run on the viewer's television, ad selector 36 applies the rules defined in campaign planner 34 to determine which advertiser's campaigns and which ads in those campaigns are to be eligible for that viewing of the requested video by the viewer. Ad selector 36 then selects certain ones of the eligible ads for presentation to viewer 16 during the viewing of the requested video. Video server 30 inserts the selected ads at appropriate insertion points in the requested video. Viewer 16 then views the selected ads and the requested video on the viewer's television.

Figure 2:
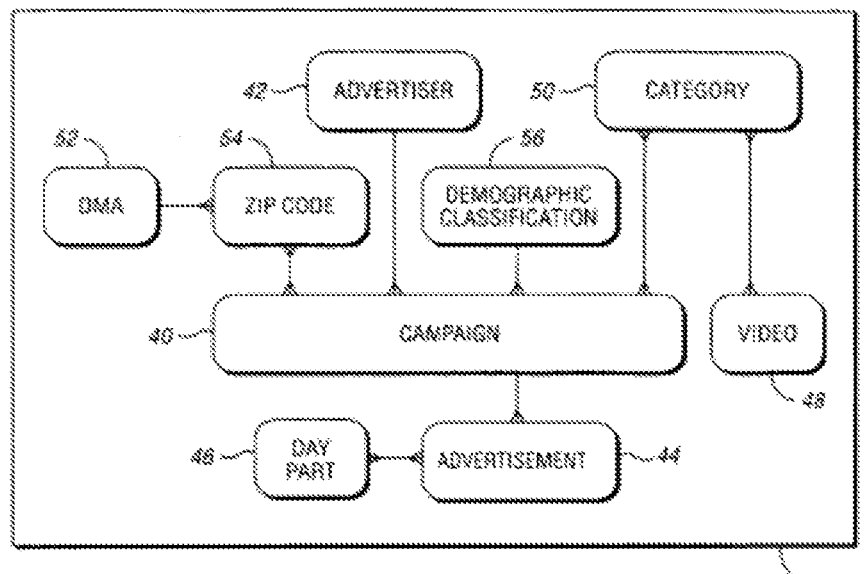
FIG. 2 illustrates a block diagram of the logical structure of the database of the campaign planner subsystem of the VOD system shown in FIG. 1.

Referring now to FIG. 2, with continual reference to FIG. 1, a block diagram illustrating the logical structure of campaign planner 34 is shown. Campaign planner 34 is based on a database having the illustrated logical structure. The logical structure includes at least one advertising campaign 40. Each advertising campaign 40 belongs to an advertiser 42. (For simplicity, it is assumed that there is only one advertiser 42. It is noted that advertiser 42 may have many campaigns and there may be many advertisers having many advertising campaigns.)

Advertising campaign 40 has one or more ads 44. As such, each ad 44 belongs to an advertiser 42 and is in an advertising campaign 40 of that advertiser. Advertiser 42 pays for its ads 44 based on the number of times its ads are viewed by viewers 16 and 18 during the presentation of requested videos to the viewers. Each ad 44 has a cost that is charged to a budget of advertising campaign 40. The ad cost is the product of the time duration of ad 44 and the per-unit time cost associated with advertising campaign 40. In addition to the campaign budget, advertising campaign 40 has start and end dates during which the ads of the advertising campaign may run.

Each ad 44 in advertising campaign 40 has an associated run frequency. The run frequency expresses the relative frequency with which the ads in advertising campaign 40 may run for viewers 16 and 18. Further, each ad 44 in advertising campaign 40 has an associated set of day parts 46 which constrains the time of day that the ads may run for viewers 16 and 18.

As indicated above, each available video 48 has content that satisfies at least one content category 50. Advertising campaign 40 is associated with at least one content category 50. Videos 48 having content that satisfies the content categories 50 associated with advertising campaign 40 are eligible for being presented with ads 44 of the advertising campaign. The rules may be defined such that the content of a video must fall into at least one of, a subset or group of, or all of the content categories 50 associated with advertising campaign 40 in order to be eligible for being presented with ads 44 of the advertising campaign.

Each video 48 is associated with a specified number of ad avails (i.e., a specified number of ads which may run with the video). When viewer 16 decides to watch a requested video 48, ad selector 36 selects ads 44 to be played for that viewing of that video based on the defined rules with the number of ads being selected such that the number of ad avails are filled.

Campaign planner 34 enables advertising campaigns 40 to be defined in terms of geography, demographics, and the content in which ads 44 will appear. Advertising campaigns 40 are defined using information which can be described as "who they are what they watch" and may be defined based on: 1) geographic and demographic information corresponding to the households of the viewers; and 2) the type of content of the requested video. Advertising campaigns 40 may also be defined such that some or all of ads 44 of the advertising campaigns are restricted to play during certain day times. The goal in associating rules with advertising campaigns 40 is to enable targeted ads 44 to be provided to viewers 16 and 18 while VOD services are being provided to the viewers.

With respect to geographic selection, campaign planner 34 allows advertising campaigns 40 to be defined as to reach households within an entire designated market area (DMA) 52, households having selected ZIP codes in the DMA, households in a set of DMAs, etc.

With respect to demographic selection, campaign planner 34 allows advertising campaigns 40 to be defined as to reach households having selected demographic classifications. Demographic classification codes 56 are a list of codes which classify viewer neighborhoods into classifications based on demographic and consumer information. These codes are made available by marketers to identify audiences. For instance, the PRIZM® lifestyle segmentation system of ©Claritas Inc. classifies people in certain economic and demographic categories. The PRIZM® system classifies neighborhoods into categories or clusters based on census data, consumer surveys, and other public and private sources of demographic and consumer information. The clusters or codes of the PRIZ'.M® system are defined down to the ZIP+4 level which corresponds to 6-12 households. As such, demographic or neighborhood classification codes 56 may be defined using the PRIZM® system and/or other sources of viewer classification information.

Campaign planner 34 allows advertising campaigns 40 to be associated with selected video content categories 50. Videos 48 having content that is defined to be "in" those content categories 50 are then eligible for ads 44 of advertising campaigns 40. A particular video 48 may be "in" many content categories 50. A user uses campaign planner 34 to catalog a particular video 48 by placing the video into the content categories 50 that the content of the video satisfies.

Content categories 50 are not fixed and may be added at will. Campaign planner 34 includes a user interface that facilitates browsing by a user to list the video content that satisfies a set of content categories 50. New videos 48 that are cataloged after advertising campaign 40 is defined may be matched up with the advertising campaign.

The special case of sponsored content is accommodated by defining a specific content category, putting the sponsored videos in that category, and only running ads 44 from the advertising campaigns 40 that match the specified content category.

An advertiser may be the fractional sponsor of a particular video or series of videos. The effect is that whenever the sponsored video is viewed, an advertising campaign 40 of the advertiser has a percentage chance of its ads 44 being run with the sponsored video. For example, if 100 viewers request a sponsored video then probabilistically twenty of them will receive the ads 44 from the advertising campaigns 40 of the advertiser who is sponsoring 20% of the video.

Figure 3:
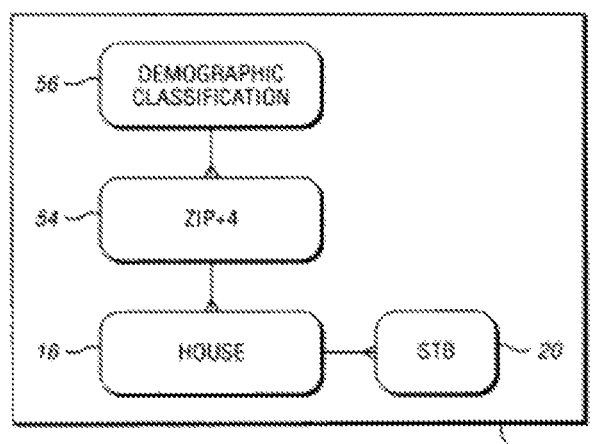
FIG. 3 illustrates a block diagram of the logical structure of the house database of the advertisement (ad) selector subsystem of the VOD system shown in FIG. 1.

Referring now to FIG. 3, with continual reference to FIGS. 1 and 2, a block diagram illustrating the logical structure of house database 38 of ad selector 36 is shown. As described above, when viewer 16 selects a particular video 48 for viewing, video server 30 passes the identifier of the viewer's STB 20 and the asset identifier of the video to ad selector 36. Ad selector 36 applies this gathered information against the rules associated with advertising campaigns 40 in order to determine which advertising campaigns and which ads in those advertising campaigns are to be presented during the viewing of the requested video 48 by viewer 16. Ad selector 36 then passes identifiers of the selected ads and time insertion points to video server 30. Video server 30 then inserts the selected ads into the insertion points in the requested video 48 for viewer 16 to view.

Ad selector 36 uses house database 38 to determine the ZIP+4 code 54 of the household in which STB 20 of viewer 16 is located based on the STB identifier. Ad selector 36 then uses house database 38 to determine a demographic classification code 56 of the household in which STB 20 is located based on the ZIP+4 code 54 of the household. The determined ZIP+4 code 54 and the determined demographic classification code 56 correspond to the household in which STB 20 is located and, consequently, likely correspond to viewer 16 of the television connected to the STB.

The logic of ad selector 36 is as follows. First, determine all feasible advertising campaigns 40; second, apply factors to select one of the feasible advertising campaigns; and third, select ads 44 from the selected advertising campaign. This logic means that all ads 44 for one viewing are from one advertising campaign 40. This is only assumed here to simplify discussion.

Ad selector 36 determines an advertising campaign 40 to be feasible if it meets the following conditions. One, the advertising campaign 40 has not exhausted its budget. Two, the requested video 48 has content which is in at least one content category 50 associated with the advertising campaign 40. Three, the advertising campaign 40 is associated with a demographic classification corresponding to the neighborhood of the residence in which the STB 20 making the viewing request is located. Four, the advertising campaign 40 is associated with a ZIP code corresponding to the residence in which the STB making the viewing request is located. Five, the advertising campaign 40 has enough ads 44 to fill all of the ad avails for the requested video 48 while meeting any constraints of day parts 46.

If there are no feasible advertising campaigns 40, then either viewer 16 views the requested video 48 without ads 44 or views the requested video with public service ads and the like. If there are multiple feasible advertising campaigns 40 from multiple advertisers 42, then a relative priority may be assigned between the advertisers to provide ads 44 from the multiple advertisers. If there is a scarcity of feasible advertising campaigns 40 such that the budget of the feasible advertising campaigns would be exhausted rapidly, then mechanisms may be implemented to control the spending rate.

With respect to ad frequency within an advertising campaign 40, suppose there are three ads (A, B, and C) in the advertising campaign with relative frequencies of 30, 50, and 67. Ad selector 36 then generates a random number between 1 and 147. Ad selector 36 selects "A" if the number is between 1 and 30; selects "B" if the number is between 31 and 80; and selects "C" if the number is between 81 and 147.

For billing and reporting purposes, video server 30 captures a record of each ad event. The ad event record includes identification of the ad provided to the viewer, identification of the requested video, the running time duration of the ad, the date and time of viewing, and ZIP and ZIP+4 codes of the household. The records are exported to a reporting and billing application.

In summary, the method and system for planning and running VOD advertising in accordance with the present invention affords advertisers a combination of capabilities of known advertising forms with novel capabilities. These capabilities include matching video content with a viewer audience. An advertiser can select a mix of content designed to appeal to a particular viewer audience. Advertisers can buy a piece of an ad hit. As such, an advertiser with a small budget can buy part of a popular video by buying a percentage of the viewer audience. The ads may flexible as a VOD is not constrained to rigid time slots as in broadcast advertising. An advertiser may buy all of the spots in some viewing of a particular video, thus enabling ads in different spots to be related to each other and combined for effect. A particular demographic may be reached as the present invention combines the selection by content I day part of broadcast television with the precise geographic I demographic classification delivery of direct mail. Advertisers know exactly what is happening with their ads as precise counts of every ad play may be provided.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method comprising:
   receiving, by a computing device, a request for a program;
   identifying a plurality of sponsors, each associated with a fractional sponsorship of the program, wherein the fractional sponsorship corresponds to a predetermined percentage of an audience for the program;
   selecting one sponsor of the plurality of sponsors to sponsor the program based at least in part on a fractional sponsorship associated with the one sponsor;
   selecting a first content item having an association with the one sponsor;
   generating, by the computing device, a modified program comprising the program and the first content item; and
   transmitting the modified program.

2. The method of claim 1, wherein the request for the program is received from a first user device and the selected one sponsor is a first sponsor, the method further comprising:
   receiving a second request for the program from a second user device;
   selecting a second sponsor from the plurality of sponsors to sponsor the program based at least in part on a fractional sponsorship associated with the second sponsor;
   selecting a second content item having an association with the second sponsor;
   generating, by the computing device, a second modified program comprising the program and the second content item; and
   transmitting the second modified program.

3. The method of claim 1, wherein the request for the program is received from a first user device and wherein the selecting the first content item is based, at least in part, on demographic information associated with a user of the first user device.

4. The method of claim 1, wherein the selecting the first content item further comprises comparing a cost associated with the first content item with a predetermined budget and wherein the first content item is selected to control a spending rate of the predetermined budget.

5. The method of claim 4, wherein the cost associated with the first content item is based on a per-unit time cost associated with an advertising campaign of the selected one sponsor.

6. The method of claim 1, wherein the selecting the first content item is further performed according to a time-of-day criterion.

7. The method of claim 1, wherein the selecting the one sponsor is further performed according to predetermined priorities assigned to the plurality of sponsors.

8. The method of claim 1, wherein the selecting the first content item is based, at least in part, on a content category assigned to the program.

9. A method comprising:
- identifying, by a computing device, a plurality of sponsors of a video program, each sponsor associated with a fractional sponsorship of the video program, the fractional sponsorship corresponding to a predetermined numeric percentage of an audience for the video program;
- selecting a single sponsor, from the plurality of sponsors, for a transmission of the video program to a first user device among a plurality of user devices, the selection based, at least in part, on an associated fractional sponsorship of the single sponsor;
- selecting a plurality of video content items associated with the single sponsor, of the plurality of sponsors, for inclusion with the transmission of the video program to the first user device, based at least in part on demographic data associated with a user of the first user device;
- generating, by the computing device, a modified video program comprising the video program and the plurality of video content items; and
- transmitting the modified video program.

10. The method of claim 9, further comprising:
- retrieving the demographic data from a demographic database using information received with a request for the video program from the first user device.

11. The method of claim 9, wherein the selecting the plurality of video content items further comprises comparing a cost associated with a first video content item of the plurality of video content items with a predetermined budget and selecting the first video content item to control a spending rate of the predetermined budget.

12. The method of claim 11, wherein the cost of the first video content item is based on a per-unit time cost associated with an advertising campaign of the single sponsor.

13. The method of claim 9, wherein the selecting the plurality of video content items further comprises selecting at least a first video content item of the plurality of video content items according to a time-of-day criterion.

14. The method of claim 9, wherein the selecting the single sponsor from the plurality of sponsors further comprises selecting the single sponsor among the plurality of sponsors according to a predetermined priority assigned to the plurality of sponsors.

15. The method of claim 9, wherein the identifying the plurality of sponsors of the video program is performed prior to receiving a request for the video program.

16. The method of claim 9, wherein the selecting the plurality of video content items is based, at least in part, on a content category assigned to the video program.

17. A method, comprising:
- storing, by a computing device, predetermined audience percentages for each of a plurality of sponsors of a program;
- for each of a plurality of transmissions of the program, selecting a corresponding one of the plurality of sponsors based on the predetermined audience percentages;
- for each of the plurality of transmissions, selecting a content item associated with the corresponding one of the plurality of sponsors;
- for each of the plurality of transmissions, generating, by the computing device, a corresponding modified program comprising the program and the content item associated with the corresponding one of the plurality of sponsors; and
- performing the plurality of transmissions of the program.

18. The method of claim 17, wherein the selecting the content item is based on a content category assigned to the program or on demographic information associated with users of user devices intended to receive the transmissions.

19. The method of claim 17, wherein each of the predetermined audience percentages for the plurality of sponsors of the program corresponds to a percentage of a viewer audience for the program.

20. The method of claim 17, wherein the storing the predetermined audience percentages for the plurality of sponsors of the program occurs prior to receiving a request for the program.

* * * * *

UNITED STATES PATENT AND TRADEMARK OFFICE
CERTIFICATE OF CORRECTION

PATENT NO. : 9,906,825 B2
APPLICATION NO. : 14/819718
DATED : February 27, 2018
INVENTOR(S) : Neville A. Black Page 1 of 1

It is certified that error appears in the above-identified patent and that said Letters Patent is hereby corrected as shown below:

In the Specification

Column 2, Summary of the Invention, Line 16:
After "time", please insert --.--

Column 3, Detailed Description of the Preferred Embodiments, Line 40:
Delete "28" and insert --26--

Column 3, Detailed Description of the Preferred Embodiments, Line 44:
Delete "2" and insert --12--

Column 6, Detailed Description of Preferred Embodiments, Line 36:
Delete "PRIZ'.M®" and insert --PRIZM®--

In the Claims

Column 9, Claim 9, Line 32:
After "items", insert --.--

Signed and Sealed this
Twenty-fourth Day of July, 2018

Andrei Iancu
*Director of the United States Patent and Trademark Office*